(12) United States Patent
Stuple

(10) Patent No.: US 10,124,712 B2
(45) Date of Patent: Nov. 13, 2018

(54) SYSTEMS, DEVICES, AND/OR METHODS FOR MANAGING VEHICLE BED EXTENSIONS

(71) Applicant: David Stuple, Troutville, VA (US)

(72) Inventor: David Stuple, Troutville, VA (US)

(*) Notice: Subject to any disclaimer, the term of this patent is extended or adjusted under 35 U.S.C. 154(b) by 0 days.

(21) Appl. No.: 15/348,910

(22) Filed: Nov. 10, 2016

(65) Prior Publication Data

US 2017/0246979 A1      Aug. 31, 2017

Related U.S. Application Data

(60) Provisional application No. 62/249,966, filed on Nov. 3, 2015, provisional application No. 62/253,997, filed on Nov. 11, 2015.

(51) Int. Cl.
| | |
|---|---|
| *B60P 3/40* | (2006.01) |
| *B60Q 1/30* | (2006.01) |
| *B60J 7/16* | (2006.01) |
| *B60R 5/04* | (2006.01) |
| *B60Q 7/02* | (2006.01) |

(52) U.S. Cl.
CPC ............... *B60P 3/40* (2013.01); *B60J 7/1621* (2013.01); *B60Q 1/30* (2013.01); *B60R 5/041* (2013.01); *B60Q 7/02* (2013.01); *H05K 999/99* (2013.01)

(58) Field of Classification Search
CPC .................................. B60P 3/40; B60R 5/041
USPC .................................. 296/26.08, 26.09, 35.3
See application file for complete search history.

(56) References Cited

U.S. PATENT DOCUMENTS

| | | | | |
|---|---|---|---|---|
| 3,004,790 | A * | 10/1961 | Mayer ..................... | B60R 5/041 296/26.09 |
| 3,730,580 | A * | 5/1973 | Page, Jr. ................... | B60P 3/34 296/176 |
| 8,534,735 | B2 * | 9/2013 | McManus ............ | B62D 47/003 296/26.08 |
| 2003/0141733 | A1 * | 7/2003 | Burg ....................... | B60R 5/041 296/26.09 |

* cited by examiner

*Primary Examiner* — Dennis H Pedder
(74) *Attorney, Agent, or Firm* — Dale Jensen, PLC; Dale Jensen

(57) ABSTRACT

Certain exemplary embodiments can provide a system, which can comprise a platform. The platform can comprise a pair of brackets via which said platform is coupleable to corresponding flanges of a vehicle. The platform, once coupled, can extend a bed of the vehicle such that, if one or more transported items are larger than the bed of the vehicle, the one or more transported items are transportable via the vehicle.

5 Claims, 10 Drawing Sheets

SYSTEMS, DEVICES, AND/OR METHODS FOR MANAGING VEHICLE BED EXTENSIONS

CROSS-REFERENCES TO RELATED APPLICATIONS

This application claims priority to, and incorporates by reference herein in its entirety, U.S. Provisional Patent Application Ser. No. 62/249,966, filed Nov. 3, 2015. This application claims priority to, and incorporates by reference herein in its entirety, U.S. Provisional Patent Application Ser. No. 62/253,997, filed Nov. 11, 2015.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a system, which can comprise a platform that extend the bed of a jeep, pickup, and/or sport utility vehicle. The platform can comprise two pair of brackets via which said platform is coupleable to corresponding flanges of a vehicle. The platform, once coupled, can extend a bed of the vehicle such that, if one or more transported items are larger than the bed of the vehicle, the one or more transported items are transportable via the vehicle.

Figure 1:
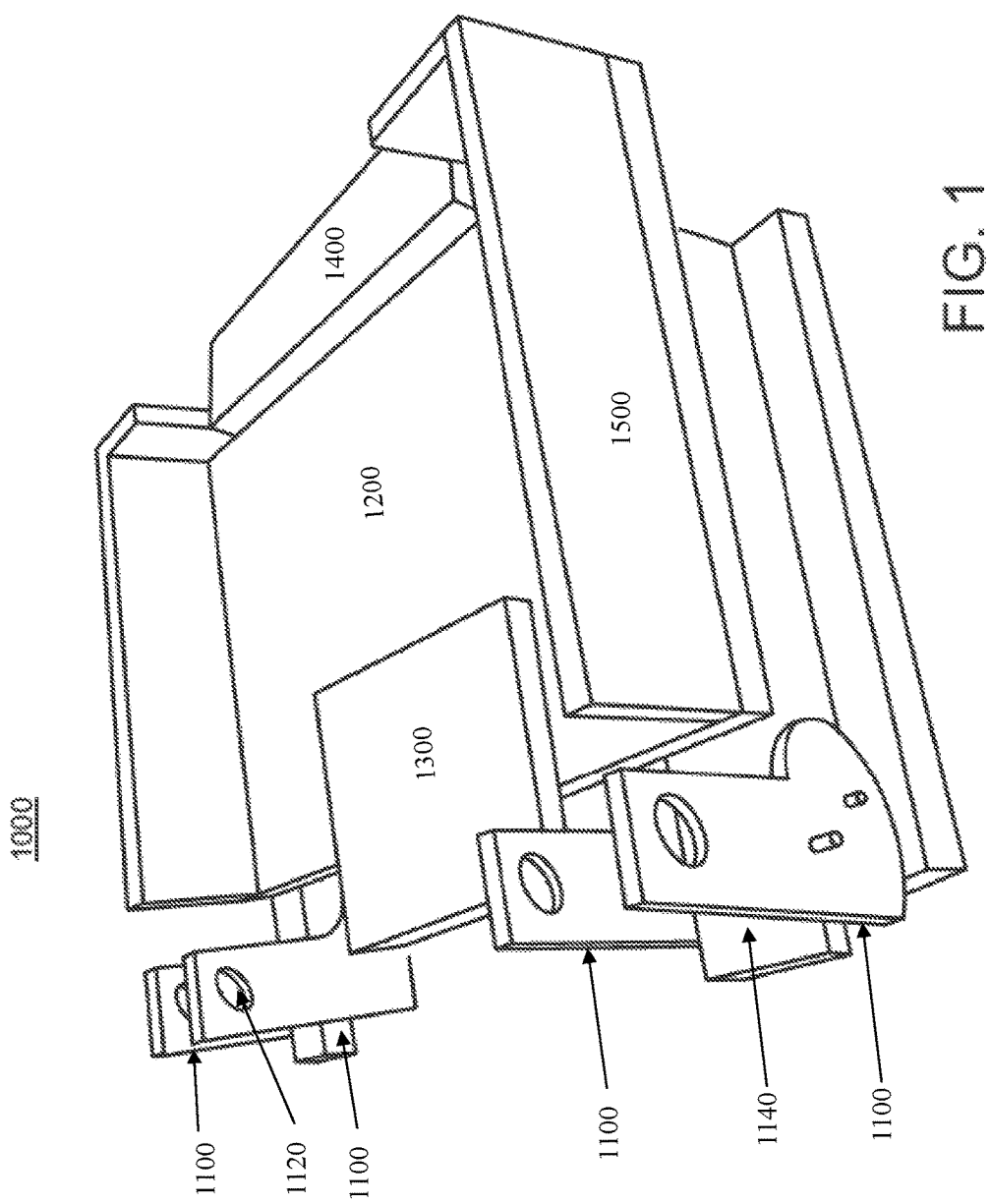
FIG. 1 is a perspective view of an exemplary embodiment of a system 1000.

FIG. 1 is a perspective view of an exemplary embodiment of a system 1000, which can comprise two pair of ears 1100. Operative embodiments can comprise a durable and stiff material such as aluminum, steel, stainless steel, and/or fiberglass (e.g., "Strongwell", which is a registered trademark of Strongwell Corporation 400 Commonwealth Avenue Bristol Va. 24203), etc. Two pair of brackets 1100 of system 1000 define apertures 1120 in operative embodiments. Apertures 1120 are defined by each ear of two pairs of brackets 1100 that are constructed to be operatively coupled to corresponding vehicle mounts (e.g. on a Jeep, which is a registered trademark of Chrysler Group LLC, 1000 Chrysler Drive, Auburn Hills Mich. 48326).

By coupling two pairs of brackets 1100 to corresponding vehicle mounts, system 1000 is constructed to provide additional carrying space of the vehicle. When coupled to the vehicle, with or without an additional load added, system 1000 is constructed to apply a lifting force to the portion of the vehicle to which it is mounted as a result of a moment of inertia resulting from torsion about an axis defined by the apertures.

System 1000 can comprise:
- a platform 1200;
- two pair of brackets 1100 via which platform 1200 is coupleable to corresponding flanges of a vehicle, wherein each pair of brackets comprises a base 1140 and each bracket defines an aperture 1120 via which a fastener passes;
- a lip 1300 that extends over a portion of the vehicle such that downward motion of platform 1200 relative to the vehicle is restrained;
- a tailgate 1400 that opens to allow for placement of one or more transported items on platform 1200 and closes to restrain motion of the one or more transported items relative to platform 1200;
- a gusset (see gusset 3700 of FIG. 3) coupled under lip 1300, the gusset stiffening lip 1300 to restrain deflection of lip 1300 when the one or more transported items are heavy;
- sidewalls 1500 coupled to platform 1200; and/or
- a pair of lights (see pair of lights 7020 of FIG. 7) that are coupleable to an electrical system of the vehicle to provide illumination.

In certain exemplary embodiments, platform 1200, once coupled, extends a bed of the vehicle such that, if the one or more transported items are larger than the bed of the vehicle, the one or more transported items are transportable via the vehicle.

Those skilled in the art will recognize that variations in system 1000 and/or other embodiments disclosed herein are within the scope of this disclosure. For example, lip 1300 can have a different size and/or orientation and/or can comprise more than one piece. As another example, the size and/or position of two pair of brackets 1100 can be changed to accommodate differing vehicle mounts. Vehicle mounts coupled to two pair of brackets 1100 can be provided with the vehicle when manufactured and/or retrofitted to accommodate system 1000. Some embodiments can comprise a brace and/or member that contacts a bumper of the vehicle to assist in supporting a cantilevered weight of system 1000 and/or restrain motion of system 1000 relative to the vehicle.

Figure 2:
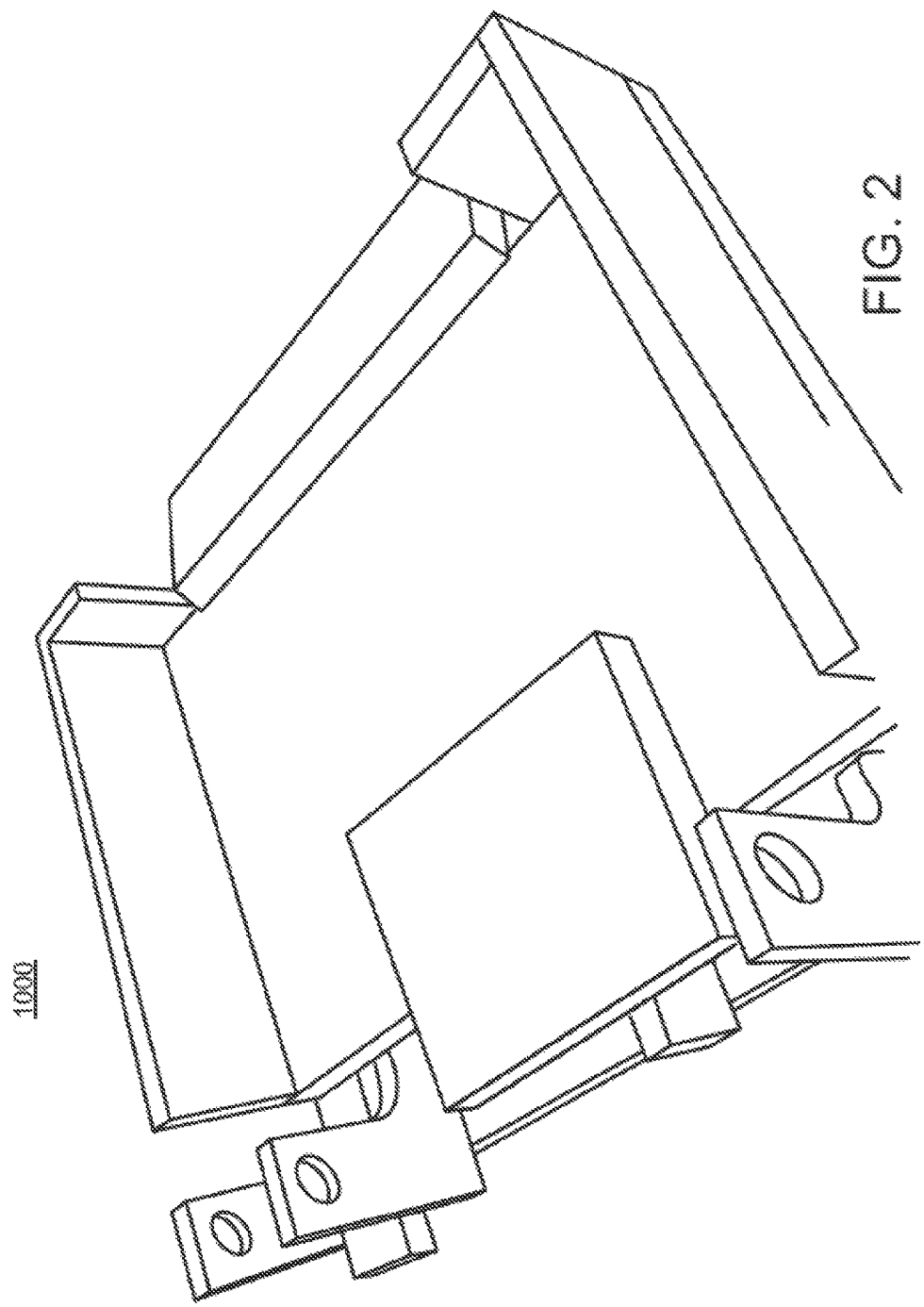
FIG. 2 is a perspective view of an exemplary embodiment of system 1000.

FIG. 2 is a perspective view of an exemplary embodiment of system 1000, which illustrates a slightly different view as compared to FIG. 1. FIG. 2 illustrates a bridge between a surface of system 1000 and the vehicle when system 1000 is operatively coupled to the vehicle. System 1000 comprises sidewalls and a rotatable tail gate.

Figure 3:
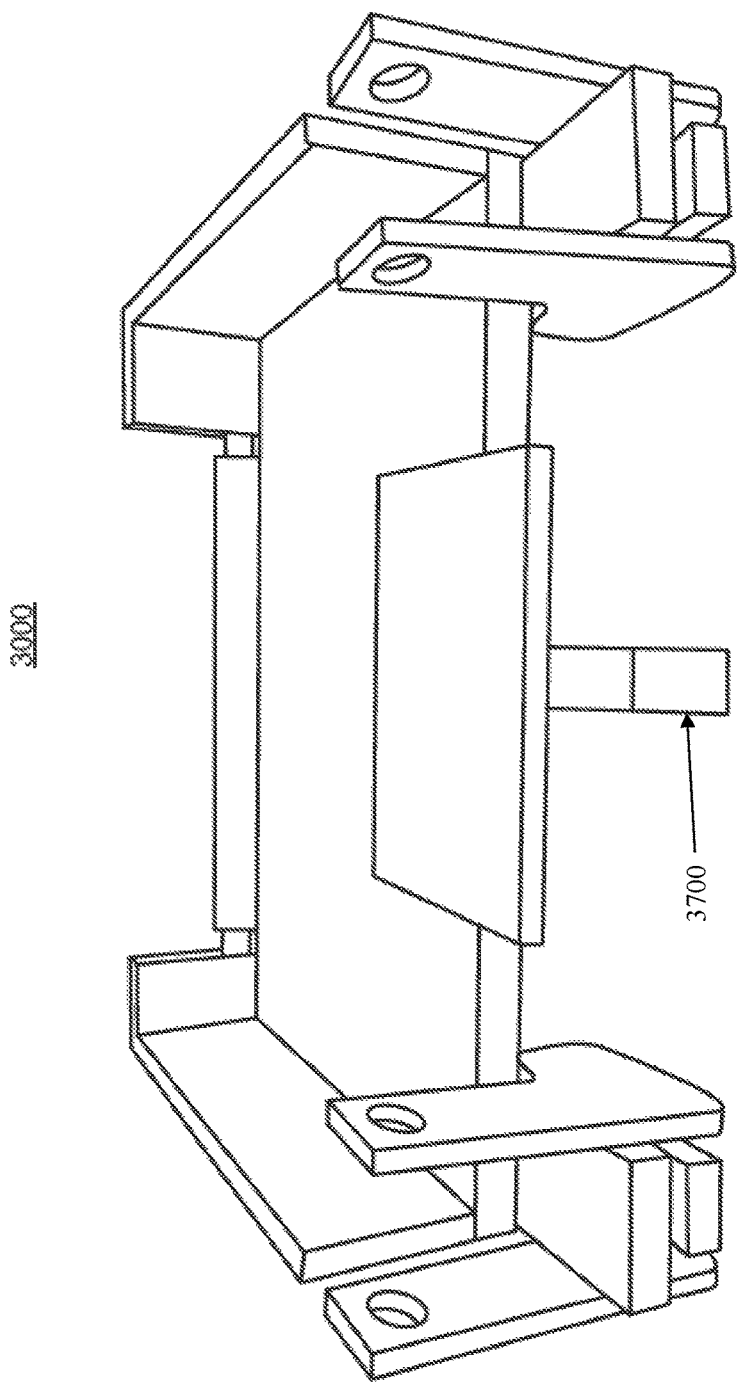
FIG. 3 is a perspective view of an exemplary embodiment of system 3000.

FIG. 3 is a perspective view of an exemplary embodiment of system 3000, which shows more of an end view. System 1000 comprises stiffeners constructed to resist deformation of system 1000 when coupled and loaded. System 1000 comprises mounting bases between each pair of flanges. The mounting bases provide a means of applying an upward thrust to the portion of the vehicle to which system 1000 is coupled.

Figure 4:
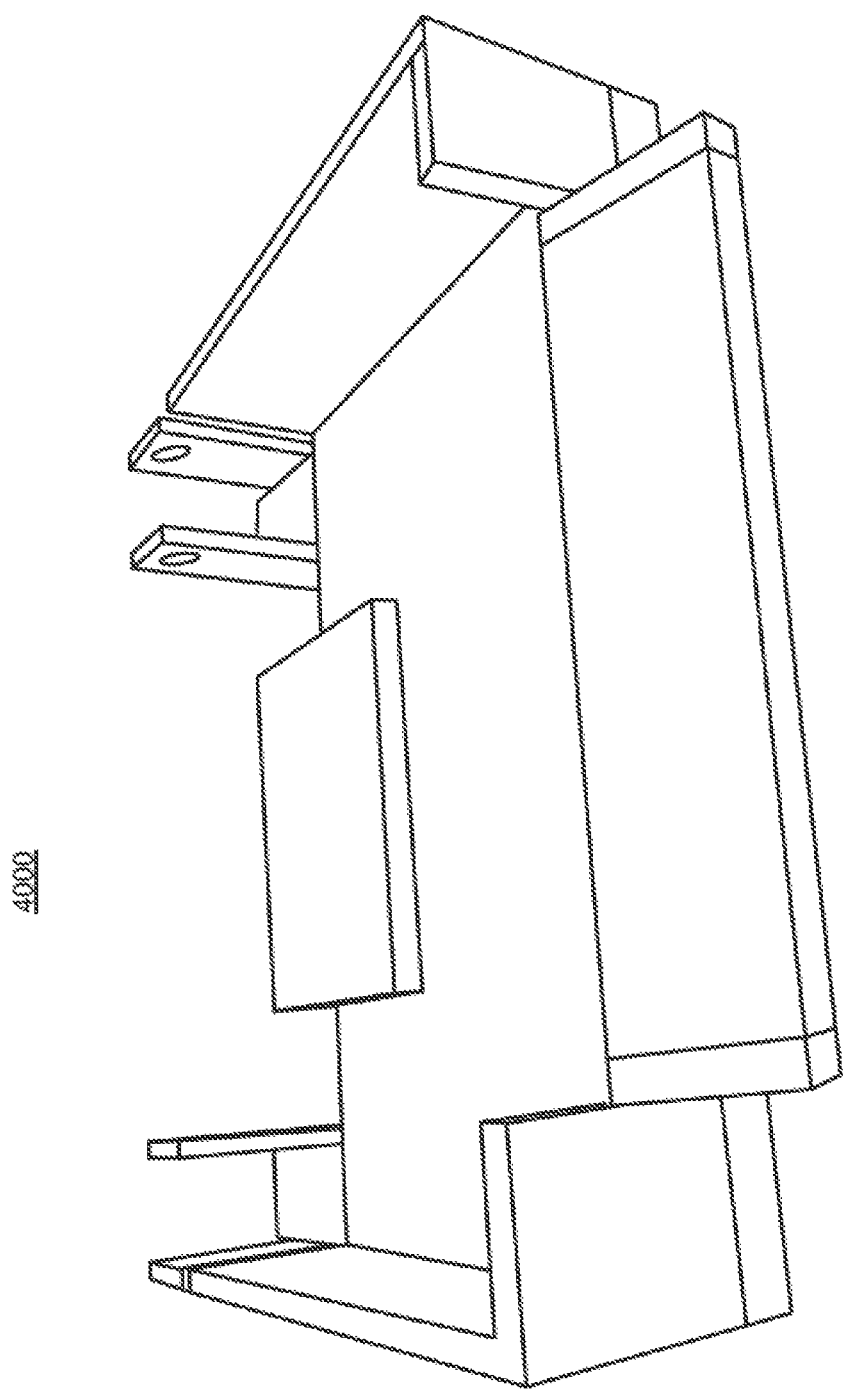
FIG. 4 is a perspective view of an exemplary embodiment of system 4000.

FIG. 4 is a perspective view of an exemplary embodiment of system 4000, which illustrates an end view when system 4000 is viewed from behind the tailgate.

Figure 5:
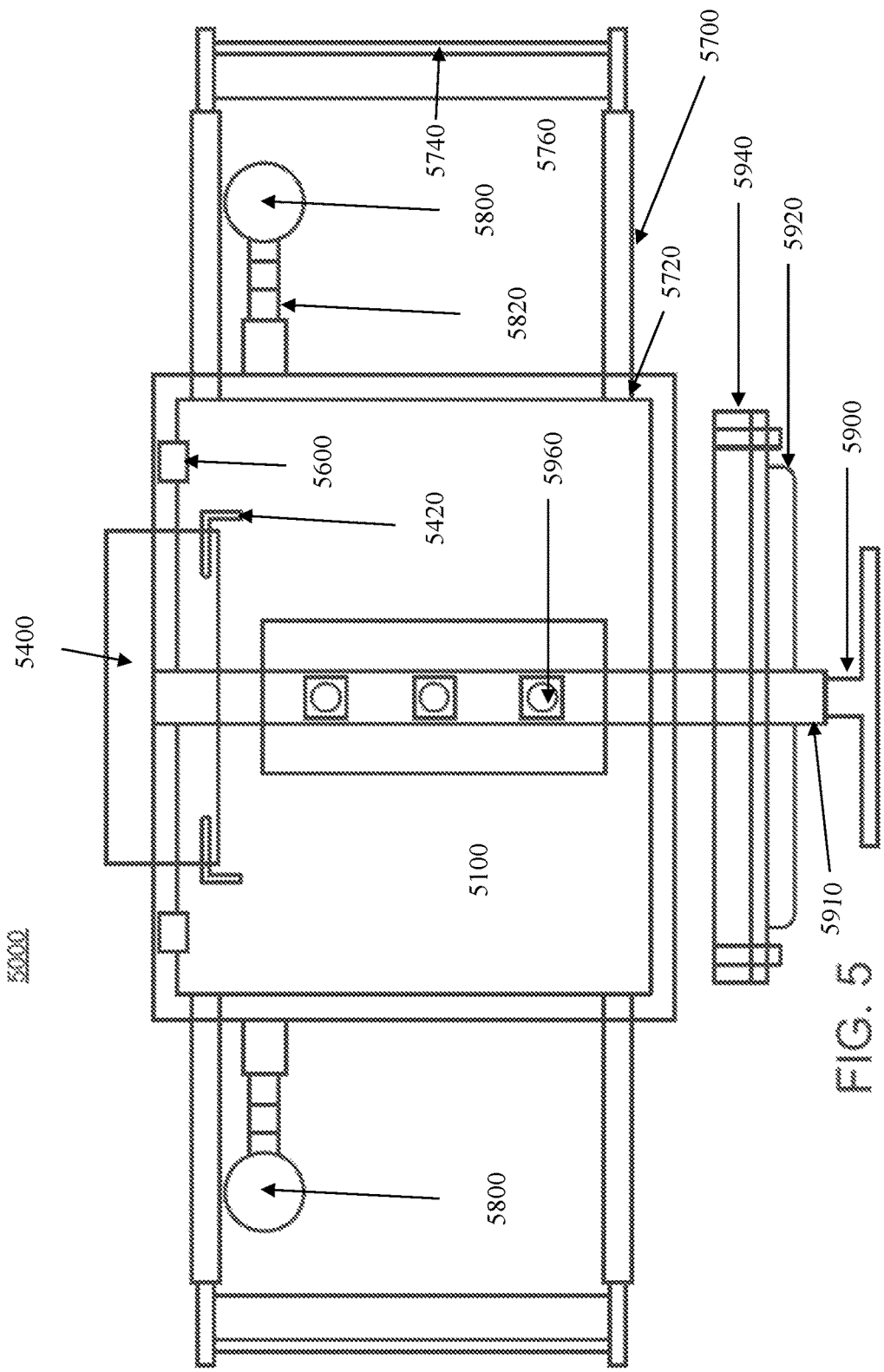
FIG. 5 is a plan view of an exemplary embodiment of a system 5000.

FIG. 5 is a plan view of an exemplary embodiment of a system 5000, which illustrates a hitch 5900 and a bumper 5920 that are comprised by a vehicle. System 5000 shows an exemplary embodiment coupled to hitch 5900 via a hitch receiver 5910. Hitch receiver 5910 can be coupled to a panel 5940 (e.g., a panel that comprises aluminum, steel, stainless steel, and/or fiberglass, etc.), which can interact with bumper 5920 to restrain motion of system 5000 relative to the vehicle. Hitch receiver 5910 can be coupled to a platform 5100 via a set of fasteners 5960. In the illustrated embodiment, Hitch receiver 5910 is shown as a member that extends substantially to below a tail gate 5400.

Tail gate 5400 that can be raised or lowered at the convenience of a user and can be held in a raised position via pins 5420. System 5000 comprises a pair of wheels 5800, which are illustrated in a raised position. Certain exemplary embodiments provide wheels 5800 that can be rotatably lowered to touch the ground via support assembly 5820 when the vehicle is moving. In other embodiments, wheels 5800 are substantially permanently in contact with the ground and are not rotatable as illustrated. System 5000 can comprise a pair of covers 5760 that can be rotated to substantially cover platform 5100. Pair of covers 5760 can comprise supports 5700 and/or handles 5740, which can be tubes. Pair of covers 5760 can be rotatable via hinge points 5720. System 5000 can comprise a pair of tail lights 5600.

Figure 6:
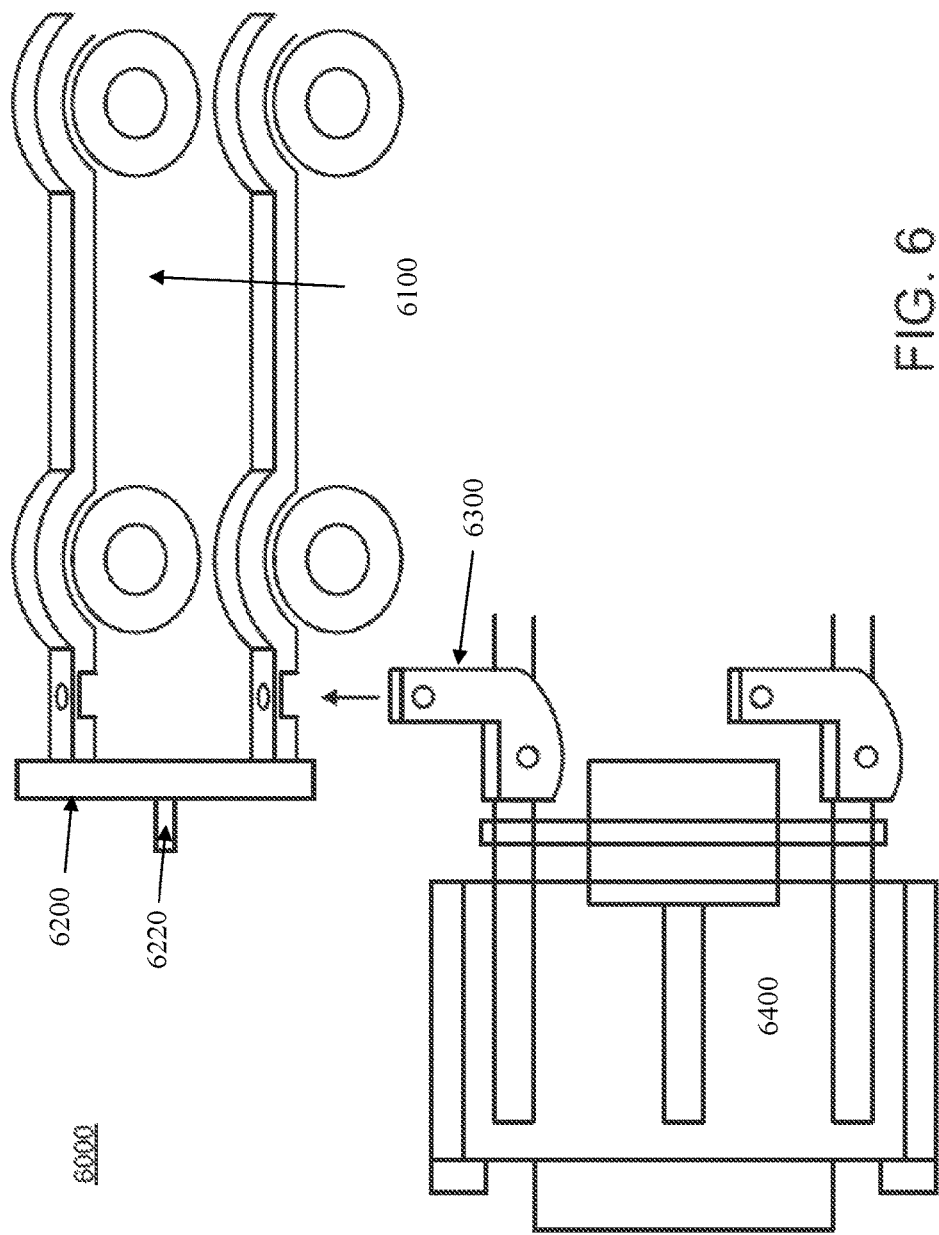
FIG. 6 shows views of an exemplary embodiment of a system 6000.

FIG. 6 shows views of an exemplary embodiment of a system 6000, which comprises a vehicle 6100. Vehicle 6100 comprises a bumper 6200 and a hitch 6220. System 6000 comprises a bed extension 6400, which is coupleable to vehicle 6100 via two pairs of brackets 6300. For example, grade 8 bolts can be used to couple two pairs of brackets 6300 to corresponding apertures defined by vehicle 6100. A receiver comprised by bed extension 6400 can be coupled to hitch 6220.

Figure 7:
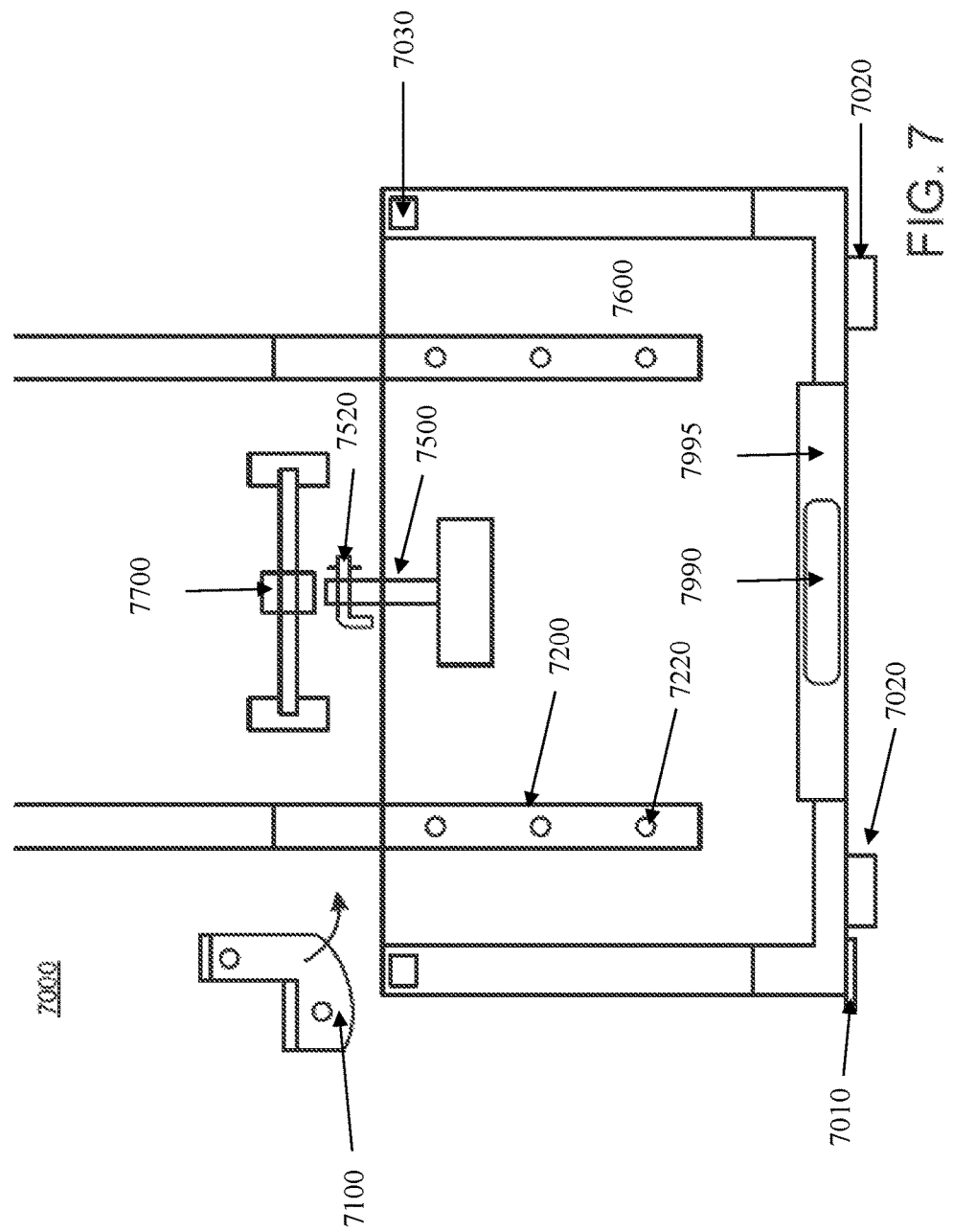
FIG. 7 shows views of an exemplary embodiment of a system 7000.

FIG. 7 shows views of an exemplary embodiment of a system 7000, which illustrates a hitch 7700 comprised by a vehicle. In the illustrated embodiment, members 7200 of system 7000 extend between the vehicle and platform 7600 to provide structural support for suspending platform 7600 behind the vehicle. Members 7200 can be coupled to the bed extension via set of fasteners 7220. Platform 7600 can be coupled to the vehicle via a receiver 7500 and a fastener 7520. In certain exemplary embodiments, fastener 7520 can be a J bolt. System 7000 utilizes an approach wherein a vehicle tail gate is relocated to a back of system 7000. The illustrated embodiment shows a location of vehicle tail lights 7030 that are partially obstructed by the bed extension. The bed extension is coupled to the vehicle in part via fasteners, which are coupled to one or more pair of brackets 7100. In certain exemplary embodiments, the fasteners can be J bolts. System 7000 utilizes a door 7995 that has been relocated from a rear portion of the vehicle to be the tail gate of the bed extension. In some embodiments, door 7995 can at least partially house a spare tire 7990 for the vehicle. System 7000 can comprise a pair of tail lights 7020 and/or a license plate holder 7010.

Figure 8:
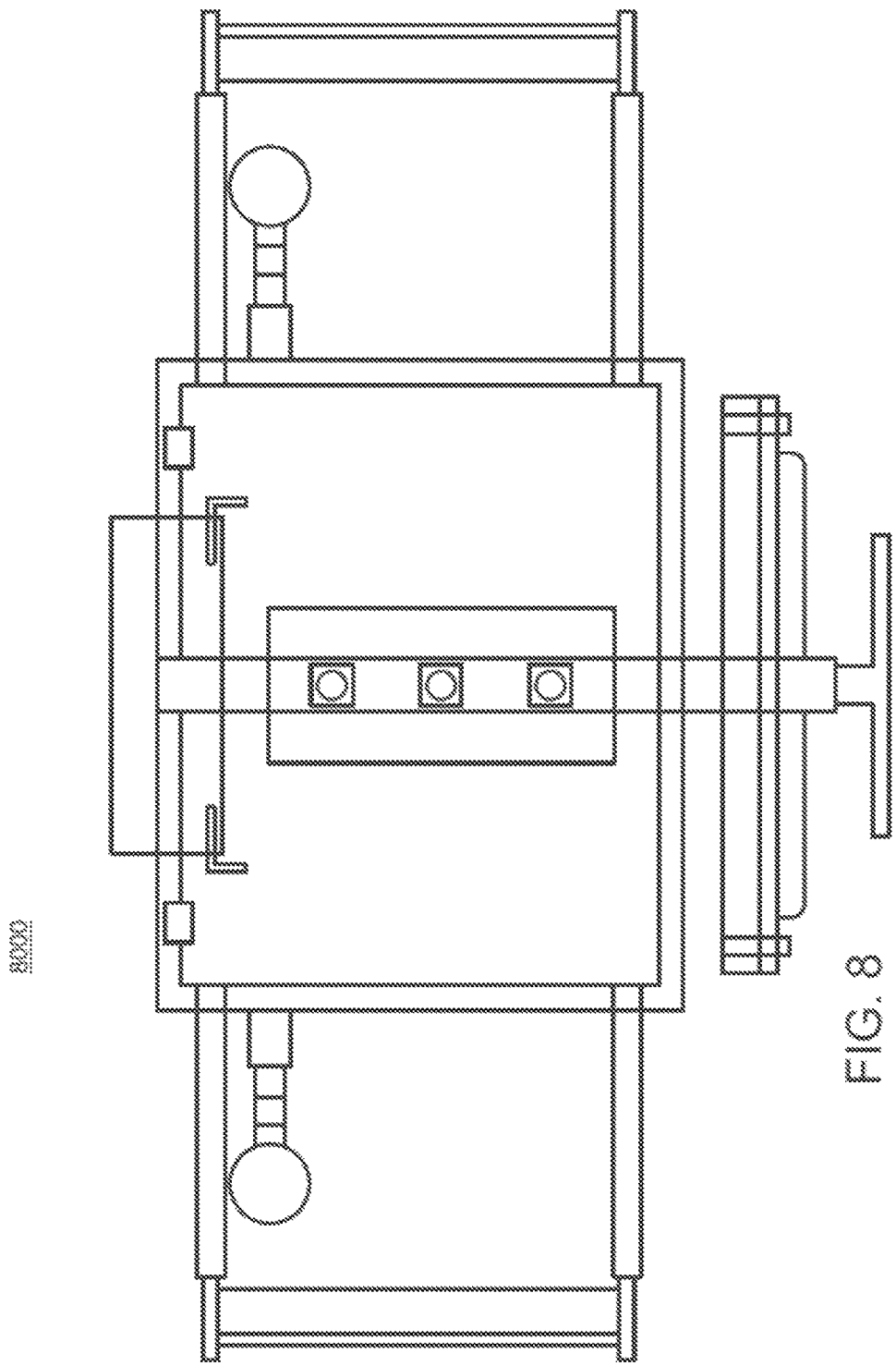
FIG. 8 is a plan view of an exemplary embodiment of a system 8000.

FIG. 8 is a plan view of an exemplary embodiment of a system 8000, which illustrates an embodiment similar to system 5000 of FIG. 5.

Figure 9:
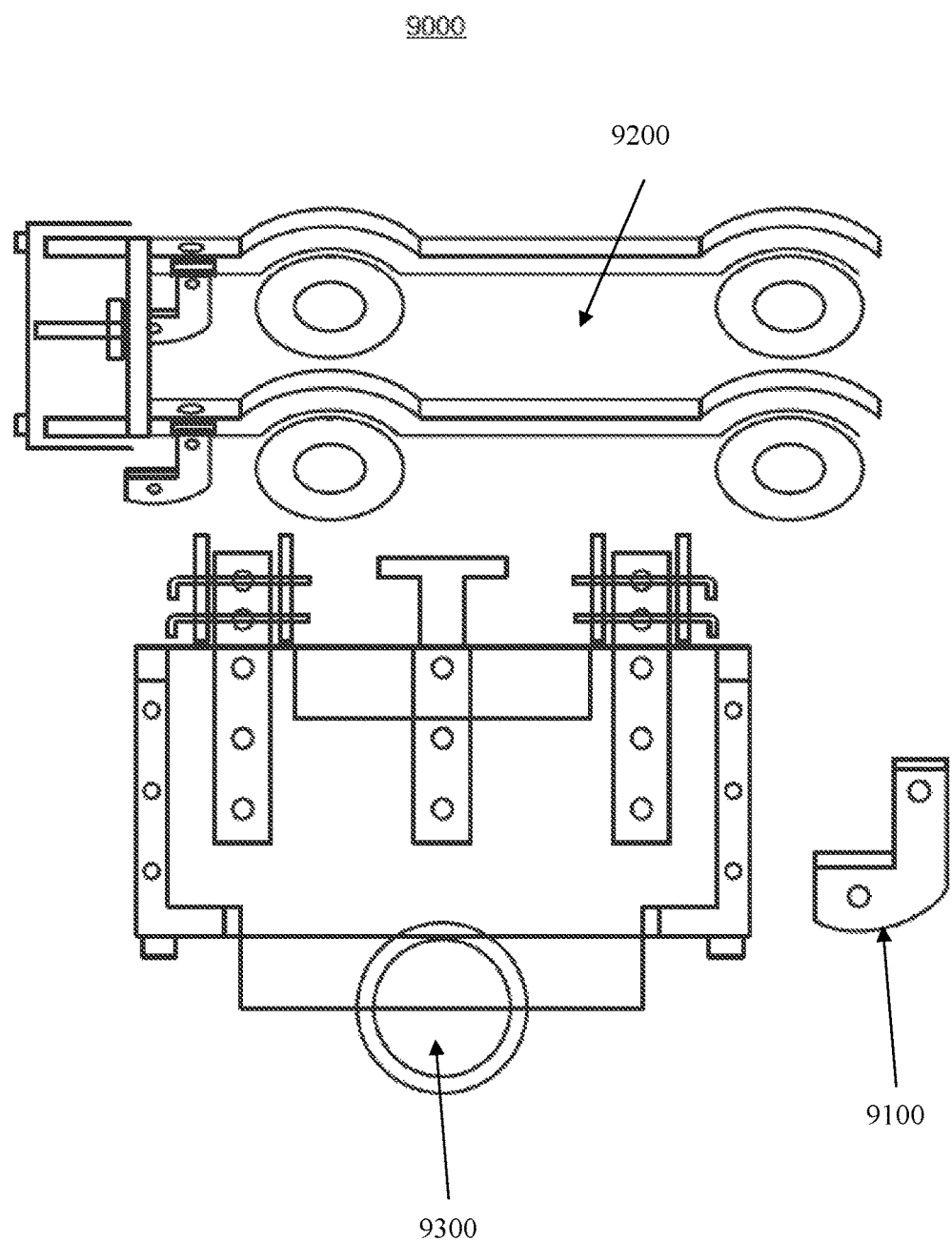
FIG. 9 comprises a side view and a plan view of an exemplary embodiment of a system 9000.

FIG. 9 comprises a side view and a plan view of an exemplary embodiment of a system 9000.

Figure 10:
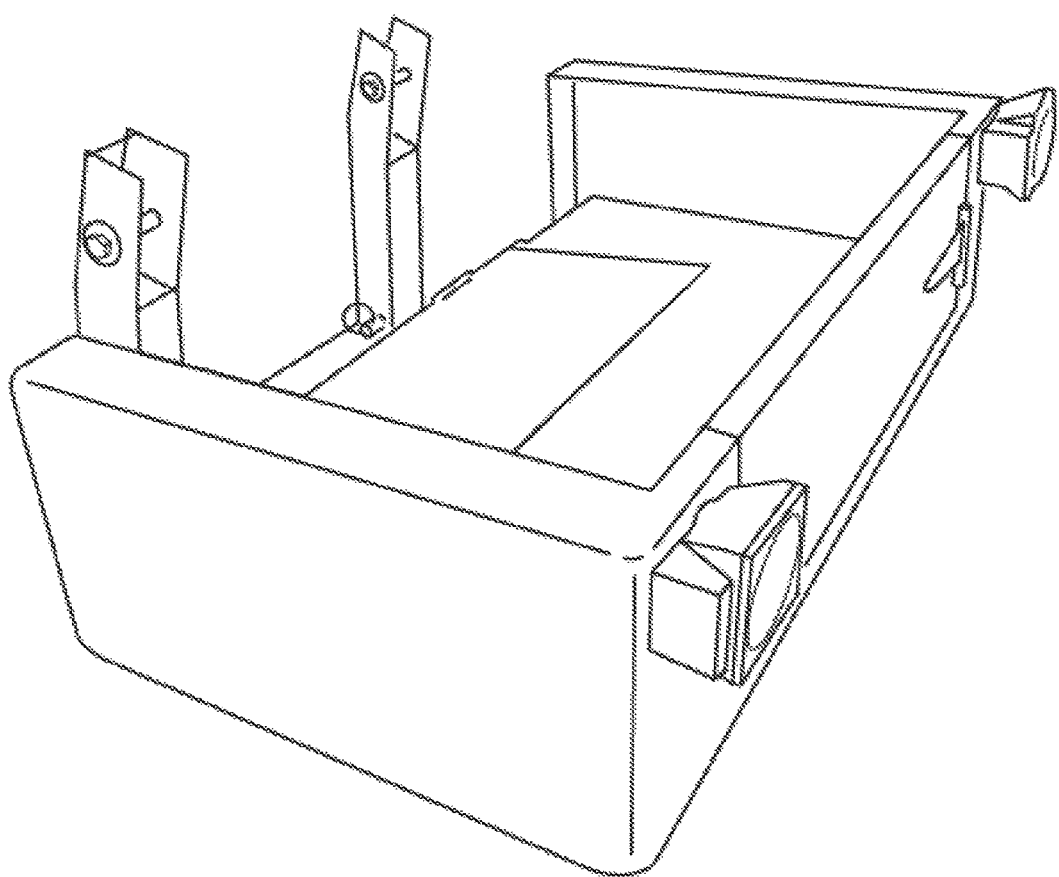
FIG. 10 is a perspective view of an exemplary embodiment of system 10000.

FIG. 10 is a perspective view of an exemplary embodiment of system 10000, which illustrates a bed extension system with tail lights.

Certain exemplary embodiments can be installed utilizing a plurality of J hook fasteners (e.g., approximately ¾ inch J hook fasteners) with a snap down latch. For example the receiver channel can be secured into place and can be designed to let the channel pivot slightly to push pressure up and easily unhook for storage when not being used. An adapter can be slid into a channel (e.g. an approximately ¾ inch channel) to couple a bed extension to a receiver comprised by the vehicle. The bed extension can comprise sidewalls that can be of a suitable thickness (e.g., approximately ⅜ inches thick aluminum, steel, stainless steel, and/or fiberglass, etc.) that restrain payloads from moving off of the bed extension. The bed extension can comprise a tail gate, which can be relocated from the vehicle to a back portion of the bed extension. Fasteners that previously coupled the tail gate to the vehicle can be reused to couple the tail gate to the bed extension.

Certain exemplary embodiments can comprise tail lights that are installed on the bed extension. A wiring harness can be used to plug the tail lights into an electrical system of the vehicle. The bed extension can comprise a channel that at least partially shields one or more of the tail lights from damage. In certain exemplary embodiments, a license plate holder can be either relocated from a body of the vehicle and/or a license plate holder can be installed on the bed extension. In certain exemplary embodiments, substantially all components of a bed extension system can comprise aluminum. In other embodiments, substantially all structural components can comprise aluminum, steel, stainless steel, and/or fiberglass (e.g., Strongwell), etc. Certain exemplary embodiments can be painted to be color matched with a vehicle to which the bed extender will be coupled.

Certain exemplary embodiments can comprise a frame mount that is made to swivel to push weight to the frame via an existing hole. The bed extension puts weight back to an axle pivot point, which acts to push the front end back down.

Certain exemplary embodiments provide system is easily uncoupled from a vehicle with the pull of hitch pins. The bed of exemplary systems can be painted to match a color of the vehicle to which it is to be coupled. A user can remove a license plate and/or bracket off of the vehicle and couple the license plate and/or bracket to exemplary embodiments at the tailgate. Factory hardware can be reused in a simply refastened. Mounting brackets of exemplary frames are constructed to be coupled to a vehicle bed via fasteners such as bolts. Certain exemplary embodiments can comprise additional brackets to couple the system away from factory exhaust can be adjacent to locations on the vehicle where the system might otherwise be coupled. The mounting system and the bed of disclosed embodiments were designed by the inventor. Certain exemplary embodiments can be easily installed and/or removed with hand tools and without significant mechanical skills. Those skilled in the art will recognize that dimensions and configurations can change as vehicles change over time.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
activity—an action, act, step, and/or process or portion thereof.
adapter—a device used to effect operative compatibility between different parts of one or more pieces of an apparatus or system.
allow—permit.
and/or—either in conjunction with or in alternative to.
aperture—an opening or hole.
apparatus—an appliance or device for a particular purpose
associate—to join, connect together, and/or relate.
base—a bottom support of something.
bed—a portion of a vehicle, usually behind a passenger compartment, that allows for storage and/or carriage of cargo.
bracket—a projecting support for an overhanging weight.
can—is capable of, in at least some embodiments.
close—to move from an open position.
comprising—including but not limited to.
configure—to make suitable or fit for a specific use or situation.
connect—to join or fasten together.
constructed to—made suitable or fit for a specific use or situation.
corresponding—similar in position relative to something else.
couple—to join, connect, and/or link together.
coupling—linking in some fashion.
define—to establish the outline, form, or structure of.
deflect—to bend.
device—a machine, manufacture, and/or collection thereof.
downward—toward the earth's surface.
ear—a part that extends upward and/or outward from a surface and to which an object is coupleable.
electrical system—a set of components that provide electrical energy to electrical loads.
extend—to increase a length of.
fastener—one (or more) restraints that attach to, extend through, penetrate, and/or hold something. For example, a fastener can be one (or more) bolt and nut assembly, rivet, weldment, nail, screw, peg, staple, clip, buckle, clasp, clamp, hook and loop assembly, adhesive, and/or plastic push rivet, etc.
flange—a projecting support to which an overhanging weight can be coupled.
gusset—a plate that couples and/or provides reinforcing strength and/or stiffness to structural members.
heavy—having substantial weight relative to a weight of a load bearing system.
illumination—a supply of light.
install—to connect or set in position and prepare for use.
item—an object.
larger—bigger in size.
light—a device and/or system that illuminates via electrical energy.
lip—a projecting edge of an object.
may—is allowed and/or permitted to, in at least some embodiments.
method—a process, procedure, and/or collection of related activities for accomplishing something.
motion—a process of changing position.
open—to move from a closed position.
pair—two of something.
pass—to go through something.
placement—an act of putting something in a location.
platform—a structure that comprises a horizontal surface.
plurality—the state of being plural and/or more than one.
portion—part.
predetermined—established in advance.
provide—to furnish, supply, give, and/or make available.
relative—in relationship to.
restrain—to limit movement of
set—a related plurality.
sidewall—a part of a platform that restrains motion of carried objects off of a lateral portion of the platform.
stiff—rigid
substantially—to a great extent or degree.
support—to bear the weight of, especially from below.
system—a collection of mechanisms, devices, machines, articles of manufacture, processes, data, and/or instructions, the collection designed to perform one or more specific functions.
tailgate—an openable back panel on a vehicle.
transport—to convey from one location to another.
vehicle—a conveyance moving on wheels, runners, tracks, or the like, as a cart, sled, automobile, truck, pickup truck, jeep, sport utility vehicle, or tractor, etc.
via—by way of and/or utilizing.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:
   a platform;
   a pair of brackets via which the platform is coupleable to corresponding flanges of a vehicle, wherein each bracket of the pair of brackets comprises a pair of ears, wherein each of the pair of ears:
   defines an aperture via which each bracket is coupled to a corresponding flange of the corresponding flanges of a vehicle via a fastener; and
   defines a plane that is substantially parallel to the plane defined by the other ear of the pair of ears;
   a lip that extends over a portion of the vehicle such that downward motion of the platform relative to the vehicle is restrained; and
   a tailgate that opens to allow for placement of one or more transported items on the platform and closes to restrain motion of the one or more transported items relative to the platform;
   wherein, said platform, once coupled, extends a bed of the vehicle such that, if the one or more transported items are larger than the bed of the vehicle, the one or more transported items are transportable via the vehicle.

2. The system of claim 1, further comprising:
   a gusset coupled under the lip, the gusset stiffening the lip to restrain deflection of the lip when the one or more transported items are heavy.

3. The system of claim 1, further comprising:
   sidewalls coupled to the platform.

4. The system of claim 1, further comprising:
   a pair of lights that are coupleable to an electrical system of the vehicle to provide illumination.

5. The system of claim 1, wherein:
   each pair of brackets comprises a base.

* * * * *